United States Patent [19]

Monzón Indave

[11] Patent Number: 4,541,164
[45] Date of Patent: Sep. 17, 1985

[54] INSTALLATION FOR THE MANUFACTURE BY A CONTINUOUS PROCESS OF COMPOUND PANELS FOR BUILDING CONSTRUCTION

[76] Inventor: Martín Monzón Indave, Rios Rosas, 46 - Madrid, Spain

[21] Appl. No.: 493,786

[22] Filed: May 12, 1983

[30] Foreign Application Priority Data

May 14, 1982 [ES] Spain .................................. 512517
Apr. 18, 1983 [ES] Spain .................................. 521573

[51] Int. Cl.⁴ .............................................. B23P 11/02
[52] U.S. Cl. .................................... 29/430; 29/33 P; 29/432; 29/564.8; 29/716; 52/309.11
[58] Field of Search ................. 29/33 P, 564.8, 446, 29/33 Q, 335, 33 K, 33 R, 432, 430; 52/309.7, 309.12, 309.11; 219/56; 198/813

[56] References Cited

U.S. PATENT DOCUMENTS

| | | | |
|---|---|---|---|
| 3,034,199 | 5/1962 | Beckman et al. | 29/33 Q |
| 3,305,991 | 2/1967 | Weismann | 52/378 X |
| 3,619,541 | 11/1971 | Webers | 219/56 |
| 3,838,241 | 9/1974 | Weismann | 198/813 X |
| 3,840,960 | 10/1974 | Toti | 29/564.8 |
| 4,079,560 | 3/1978 | Weismann | 52/309.7 |
| 4,133,097 | 1/1979 | Slade | 29/564.8 |
| 4,226,067 | 10/1980 | Artzer | 52/309.12 |
| 4,257,150 | 3/1981 | Heffner et al. | 29/33 K |
| 4,330,921 | 5/1982 | White, Jr. | 29/446 X |
| 4,336,676 | 6/1982 | Artzer | 29/446 X |
| 4,349,398 | 9/1982 | Kearns et al. | 52/309.12 |

FOREIGN PATENT DOCUMENTS 77708 5/1967 Mexico .................................. 29/716

Primary Examiner—William R. Briggs
Assistant Examiner—Glenn L. Webb
Attorney, Agent, or Firm—Ladas & Parry

[57] ABSTRACT

An installation for manufacturing panels used in building construction which panels comprise a metal framework of two parallel meshes joined by connector wires which obliquely pass through a core of lightweight material between the two parallel meshes to which latter said connector wires are welded, the installation including a conveyor device for entry into the machine, a first section of an intermittent traction and advancing device within the machine, a dispensing device for feeding connector wires to a fastening device for inserting them in the lightweight core, a second section of the intermittent traction and advancing device, a column of electrodes for welding the connector wires, a third section of the intermittent traction and advancing device, a saw device for shaping the resulting panels and automated mechanisms and systems for controlling all these elements.

18 Claims, 26 Drawing Figures

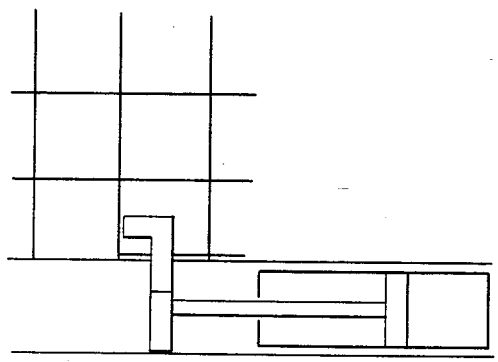
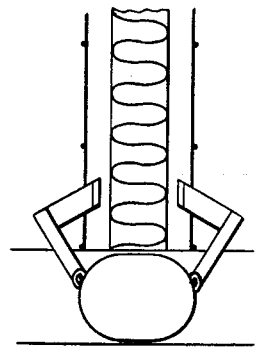
FIG.12.   FIG.13.
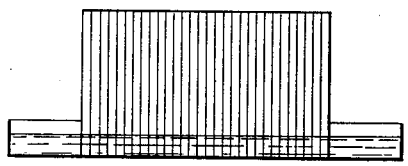
FIG.14.
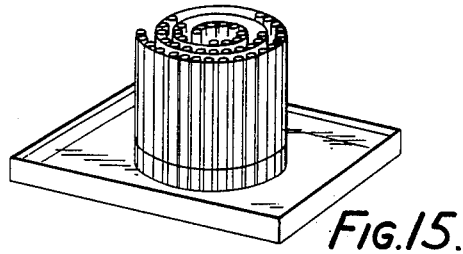
FIG.15.

INSTALLATION FOR THE MANUFACTURE BY A CONTINUOUS PROCESS OF COMPOUND PANELS FOR BUILDING CONSTRUCTION

The object of this invention is an installation for the manufacture of a compound panel, formed by a metal framework with a lightweight core, applicable preferably in building construction.

The metal framework of the panel is a three-dimensional wire grille or grating, normally having the form of two parallel meshes joined together by a series of wires welded to them and which hereafter we will call connectors.

The lightweight core is a layer of foam resin or dense box material, fibre or plastic, with reinforcing walls and indispensably unresistant to a segment of wire passing through it.

These panels are building elements fitted into the construction as walls or flooring, and are then coated with resistant mortar on both sides; the panels can easily be joined to one another on the building site, by conventional means. Known panels of this type were made with very fine wire (2 mm gauge, and mesh opening of 50 mm) and were manufactured according to the following process:

(1) The vertical meshes of the panel were preconstructed in ladderlike form, that is, with two parallel wires between which short cross-members were welded.

(2) These elements were inserted in welding machines in vertical position, and crosswires were welded to them to form the complete spatial structure.

(3) These structures were slightly sunk or imbedded in a sand bed which was made to advance upon a conveyor belt, and a foam resin was sprayed on them to form the lightweight core.

The panels were so constructed in standard sizes (5 m × 1.20 m, for example), making it necessary later to cut them on the job, with the consequential losses.

Production took place in large sheds (of an area of more than 500 $m^2$) which demanded costly investment and full-time personnel.

The mentioned problems are resolved, in this invention, by means of an installation consisting of: the essential element of a machine into one end of which are introduced, parallel and separated a suitable distance, two rolls of mesh and a sheet of lightweight material (foamed polystyrene, for example), the interior of the machine containing a system of intermitten traction which successively moves the two meshes and the sheet of lightweight material a fixed distance, equal to the size of the rectangular opening of the mesh, until they reach a fastening device consisting of a vertical battery of dischargers, which device drives a series of connector-wire segments into the sheet of lightweight material, the ends of the segments resting against the longitudinal wires of the two meshes which advance intermittently in the machine; in continuation, there is a second section of the intermittent advancing system which moves the unit thus constituted, with the connector wires in place, to a position in front of a column of electrodes which weld the connector-wire segments to the longitudinal wires of the two meshes; finally, a third section of the intermittent advancing system moves the panels with the inserted connector wires to a saw arrangement comprising one or more disk, band or laser beam saws which cut the panels to the desired size; lastly the installation contains the essential and appropriate automated mechanisms and systems.

In the first section of the installation; the manipulation of thousands of units of wire segments presents difficulties in the feeding of the machine, since any trouble or flaw causes jamming.

To avoid this, we have resorted to the alternative of a process somewhat similar to that used in stapling machines.

First, a series of connector wires are joined back-to-back in the form of combs, and their teeth or prongs are gummed with a lacquer to hold them together on a plane. The machine is fed with packs of combs in a process much more orderly than handling loose wires. In addition, one load of wires is sufficient for a full day's work by the machine. There is no longer any need to continuously load the hoppers.

The subsequent detachment of the wires from each comb, one by one for their insertion, is performed by a guillotine similar to that used in staplers, which places the wire in front of the gun fastener which thereupon drives it into the lightweight core.

The connectors may also be joined to form a continuous and flexible comb roll, using an elastic bonding lacquer with an adhesive support backing. In such case the connectors are fed from comb rolls suspended above the machine.

The combs are made outside the machine in a continuous process employing a lacquer applicator, an infrared dryer and a cutter.

In the second section of the installation, the welders grouped in columns advance and retract as the mesh passes, and it is fundamental that their electrodes always locate with certain exactness, by pressure upon it, the cross formed by the end of the connector and the longitudinal wire of the mesh.

To achieve this a mechanism has been selected by means of which the mesh, during its advance inside the machine, is drawn over a smooth belt or idler rollers, propelled by a rectractable hook which intermittently pulls against a vertical wire of the mesh. The system has been discarded of fastening the meshes and the polystyrene sheet to a continuous conveyor belt or endless chain moved by constant impulses.

The advantage of the device adopted is that even though there are panels of imperfect size (within a normal tolerance) which differ slightly from the fixed advance rate of the machine (adapted to a standard opening), there is no accumulation of defects and never a maladjustment in the positioning of the cited crosses facing the electrodes.

Naturally, there is a hook on each side for each mesh, and two on each side make traction smoother and serve to overcome any possible snag of the mesh roll.

A special embodiment of the installation is that it is movable, and can be transported by truck to a job site. Another improvement is the provision of means for adhering, to one side of the lightweight core and prior to placement of the corresponding wire mesh, an aluminum or plastic sheet to serve as a vapor barrier.

In the present invention the panels are made with larger mesh sections (approximately 10 × 10 cms) and with heavier wire (from 2.5 mm and up), thereby simplifying the process considerably, greatly reducing cost and introducing the innovation of manufacture of the panel in an endless sheet which can be cut to exact size as it exists from the machine. Only one continuous machine is required for the entire process, and the installation can be carried easily by truck to the construction site (as it occupies a space smaller than 25 m²).

A basic factor in the feasibility of this new system of manufacture has been the renunciation of a great density of fine mesh, which was thought necessary to prevent the sprayed mortar from falling off; however, experience has shown that there is fully satisfactory adherence with a 10×10 cms opening having one connector in each panel, with core in the spraying of the mortar which should be applied in two layers, one several hours after the other, and with scraping or scratching of the surface of the lightweight core to give it a rough surface.

Another basic factor has been the limitless selection of any lightweight foam or paperboard, provided it can hold the driven wires; in the prior art system it was first necessary to make the wire structure, then spray its interior with the foam resin core.

It would be very difficult to apply the system described in this invention to the fine wire previously used, since the great number of connectors and the reduced space for inserting the electrodes between the wires would greatly hinder the process.

Increased wire gauge is a notable improvement offered by the system, since there is greater resistance to rust (especially in storage at the building site), greater resistance to impacts during handling and greater rigidity of the panel during the process of assembly and concreting.

Owing to their function, connectors must be protected against rust, for which reason their composition can be important inasmuch as in certain cases the process of manufacture of the panels requires preliminary preparation. If the connectors are of stainless steel the process is the normal one explained earlier, since stainless steel is perfectly weldable. But if they are of galvanized iron their ends must be denuded or pickled so that they can be welded. This is done by introducing the packs of connector combs by their teeth or prongs in an acid bath for several minutes at a depth of some 10 mm, following which they are washed in a neutral solution.

If the surface of the connectors is plastified or impregnated with already hardened resin, roll wire is used which is straightened and then cut into measured segments, some 10 mm of the ends being ground or sharpened in an automatic machine, thereby becoming perfectly weldable where they intersect the mesh wires.

According to the described process, it is thus possible to manufacture panels of varying cross-section or of any shape, bending the two principal meshes as desired and adapting the length of the connectors to them, giving the lightweight core a form conforming to the exterior surface of the meshes.

Before describing the installation, we will make a previous observation which determines one aspect of the process. The panels are rectangular, the longer side coinciding with the perpendicular walls. The diameter of the connectors approximates that of the mesh wires, and said connectors are welded to the longitudinal wires of the panels. They are inclined with respect to said longitudinal wires of the panels, for the purpose of absorbing the shear stresses produced between the two hard layers of the concreted panel. In summary, the longitudinal wires of the panel (those parallel to the major axis) are welded obliquely to the connectors, and thus it is best that the panel be made lying on its side (on a vertical plane, with its major axis horizontal).

Another improvement of the invention are adjacent auxiliary machines for producing the mesh from plain wire, and in substitution of the roll of sheeting of lightweight material, provision is made for a likewise adjacent extruder of said lightweight material which automatically extrudes the sheeting from raw resin foam.

The process of continuous feed of the lightweight core has been initially conceived on the basis of foam material (such as polystyrene), continuously manufactured in an extension preceding the panel-making machine.

But it is possible such material is not profitable or usable for other reasons, making it necessary to foresee continuous manufacture of the core from a paperboard base in an extension preceding the said machine.

Manufacture commences from three rolls of paperboard.

The upper and lower outer surfaces of the continuous boxlike or walled rectangular tube paperboard material proceeds from respective parallel rolls of paperboard.

The heart or core between the two outer layers is a longitudinally-crimped prismatic roll of crenellated or dentated cross-section. Said crimped roll is obtained by means of a slitting mechanism and successive wheels which crease the paperboard to the eventual crenellated foam, exerting pressure downward and laterally, which crimped roll is then glued or stapled to the upper and lower rolls to form said rigid boxlike material.

The upper or lower outer layer of the boxlike material can have a slightly curved cross-section, of special interest for manufacturing core as flooring.

The paperboard must undergo previous or posterior treatment based on anti-moisture resins, so that it is not affected by the mortar or concrete which must be in contact with it or by atmospheric humidity when the material is stacked on the job site, prior to use.

To facilitate the fastening of the connector wires, their points are beveled or chamfered for easier passage through the paperboard. This is done by cutting packs of wires obliquely with the disk of the saw.

Another improvement introduced is a panel-feeding arrangement followed by a manual stapling or spot-welding device, for joining the panels together to form the meshes. Also, an arrangement is provided for feeding panels of the said material, followed by a manual glueing or stapling device for joining the panels.

Finally, the installation can be adapted to manufacture elements of varying core thickness, and to fasten connector-wire segments of different length.

To be able to introduce different thicknesses of lightweight core and thus vary the thickness of the panel, the structure of the installation must be slightly modified.

The machine has a plane of symmetry coinciding with that of the panel during its manufacture. To make panels of different thickness the machine must be divided along said plane, to either separate or bring together the two resulting halves. One of the halves remains fixed, while the other moves perpendicularly on wheels until blocked at the required distance.

In the selection of the geometry of the panel, certain dimensions must be invariable so as not to excessively complicate the machine, within the required degrees of regulation. These fixed parameters are:

The dimensions of the mesh panel.

The diameter of the mesh and of the connector.

The distance between the mesh surface and the surface of the confronting core.

The distances from the weld-pointt of the connectors to the two adjacent junction points, which must be constant.

Instead of these fixed parameters, others can be fixed without varying the essence of the machine.

Of great importance for regulating the width of the machine is the guide device which maintains the lightweight core and meshes at the proper distance during the manufacturing process. This a double series of welded vertical and the horizontal guide pins, which act as separators between mesh and core and which cover a zone from the column of welders to the entrance of the mesh, a distance of a minimum of three meters.

Upon "starting" the machine, it is fundamental to maintain the relative position of the connector-fastening batteries and of the column of welders invariable with respect to the cited network of separator guide pins, which is on the same side.

The connector magazines contain partitions which permit the housing of connectors of different lengths. The discharge needles are of maximum length and serve for all cases. As the points of incidence of the connectors in relation to the longitudinal wires of the meshes must always be, we repeat, the same distance from the neighboring junction points (so that the welders are always in front of an intersection of wires), it is necessary to vary the angle of insertion (of the connectors with respect to the discharge needles), which will be of less inclination the greater the thickness of the panel.

To widen the machine, first the movable half is unblocked and is moved parallel to itself to the desired width; it is blocked once more, and immediately the angle of incidence of the connector fasteners is varied so that the connectors cross with the longitudinal wires of the meshes at the cited fixed points, and thus the electrodes of the welder tongs then perform their function without longitudinal movement, that is, they move only in perpendicular direction toward the surface of the meshes.

For better explanation of this invention, an example will now be given with the aid of the attached drawings, in which.

Figure 4:
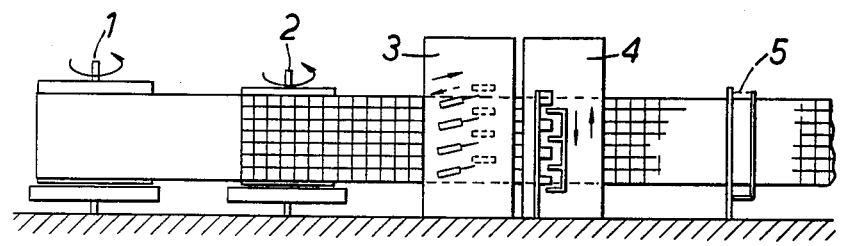
Figure 5:
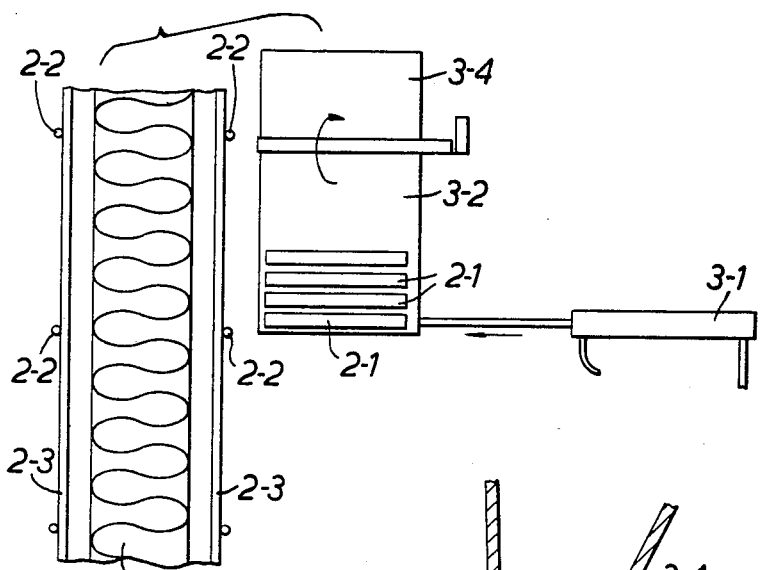
Figure 6:
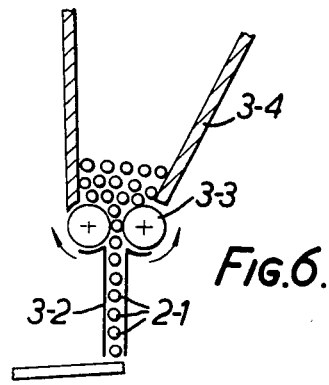
Figure 7:
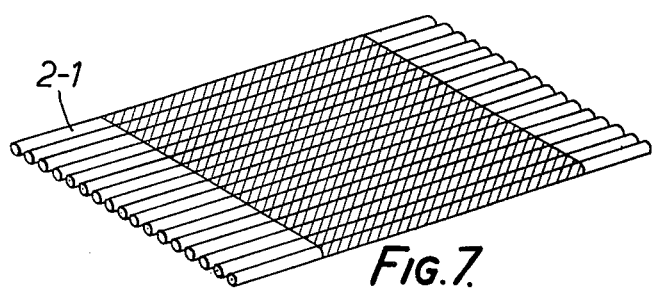
Figure 8:
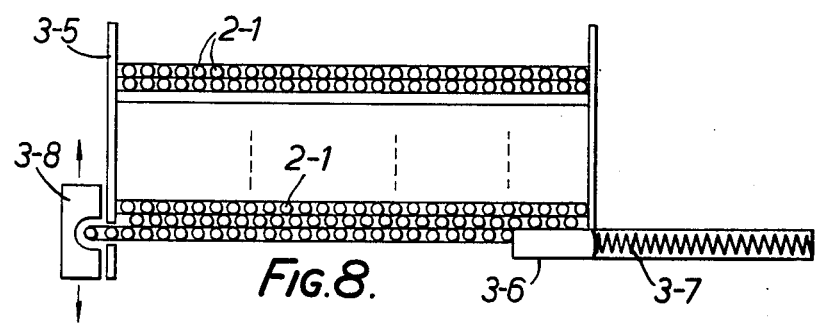
Figure 9:
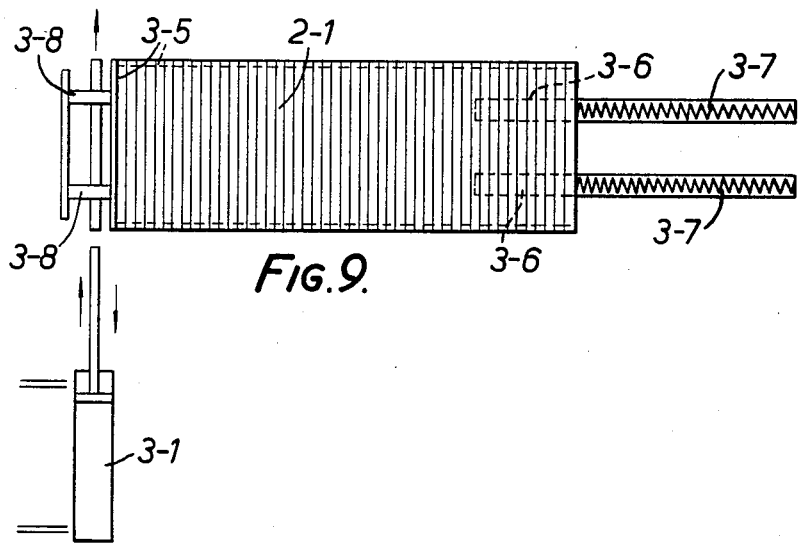

FIG. 4 diagrams the same installation in plan view;

FIG. 5 roughly diagrams a fastening device;

FIG. 6 is a diagram of an arrangement for feeding connectors to the fastening device;

FIG. 7 illustrates a comb of connectors, with the central portion daubed with lacquer;

FIG. 8 is a top view and FIG. 9 a plan view of the connector feeder-driver, substituting for the hoppers with extractor rollers as shown in FIG. 6. In the box-frame 3-5, the superimposed combs 2-1 are placed. The comb at the bottom is pushed by two rods 3-6, propelled in turn by springs 3-7. With its vertical movement, the guillotine 3-8 separates one by one the end wires housed in some slots and places them in front of the discharge needles 3-1. When the pusher 3-6 has propelled the last wire in the bottom comb it is pneumatically returned to its original starting position, permitting the next comb to drop into place by gravity, and the fastening cycle begins again.

Figure 10:
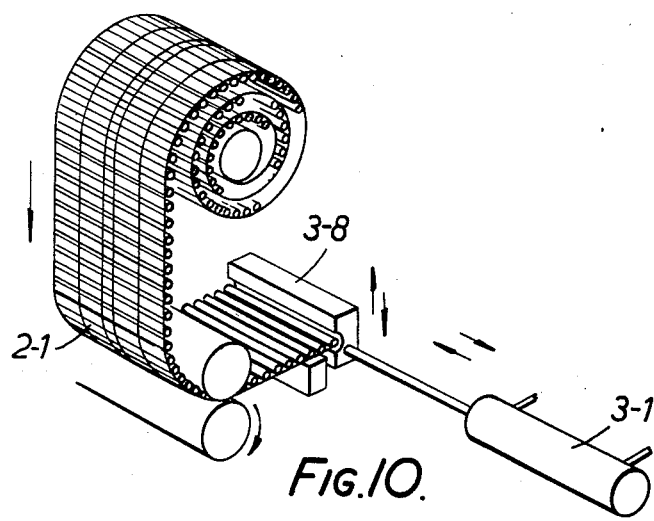

FIG. 10 shows the discharge needle 3-1, which drives the wire which has already been separated from the comb 2-1 by the action of the guillotine 3-8. This is a continuous flexible comb variation on the embodiment of flat rigid combs as illustrated in FIGS. 8 and 9. The roll is suspended above so as not to occupy space in the center of the machine.

Figure 11:
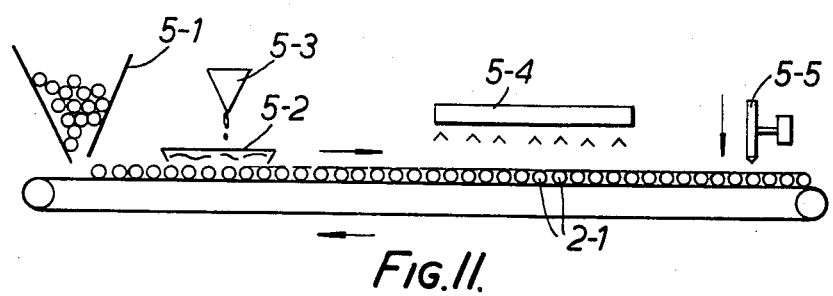

FIG. 11 illustrates the device for making the combs of wires. The hopper 5-1 drops the wires upon a conveyor belt; the viscous lacquer in hopper 5-3 drips upon the dispenser ring 5-2 and is solidified to film upon being heated by the infrared lamp 5-4; the continuous matting of wires is cut into combs with the disk 5-5.

FIG. 12 is a partial lateral view of the installation, and the sectional end view of FIG. 13 shows the retractable hooks which push the vertical wires of the meshes in this advance.

FIGS. 14 and 15 illustrate pickling in a tray of the ends of the connector wires 2-1, either in the rigid flat comb or flexible roll arrangement, the units being placed with the wires in upright position in an acid bath 10 mm deep.

Figure 16:
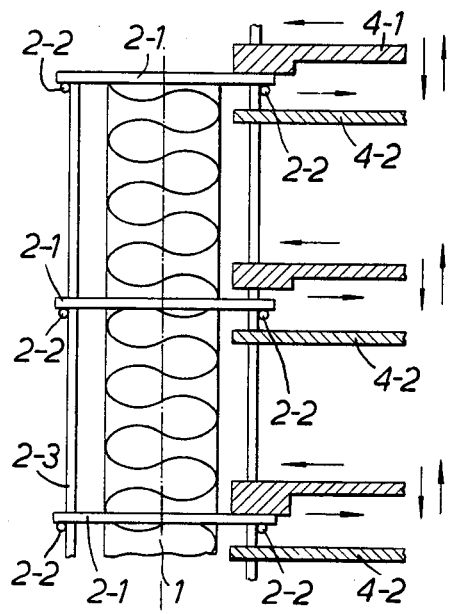
Figure 17:
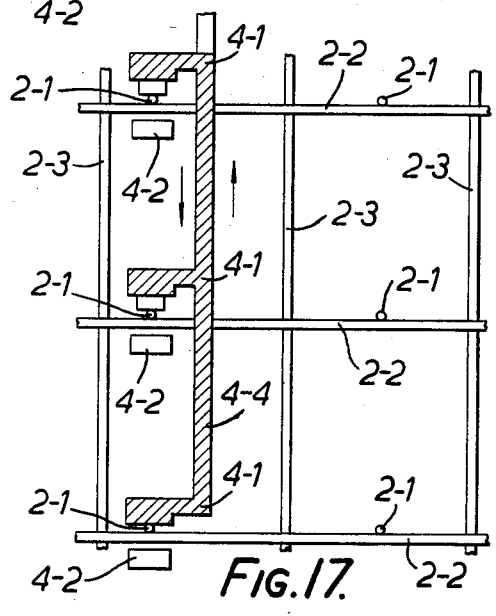

FIG. 16 diagrams one of the welding columns of the installation, in the position in which the column of electrodes has been advanced to the welding position, while FIG. 17 is a view of the welding column in the phase of execution of the welding operation.

Figure 18:
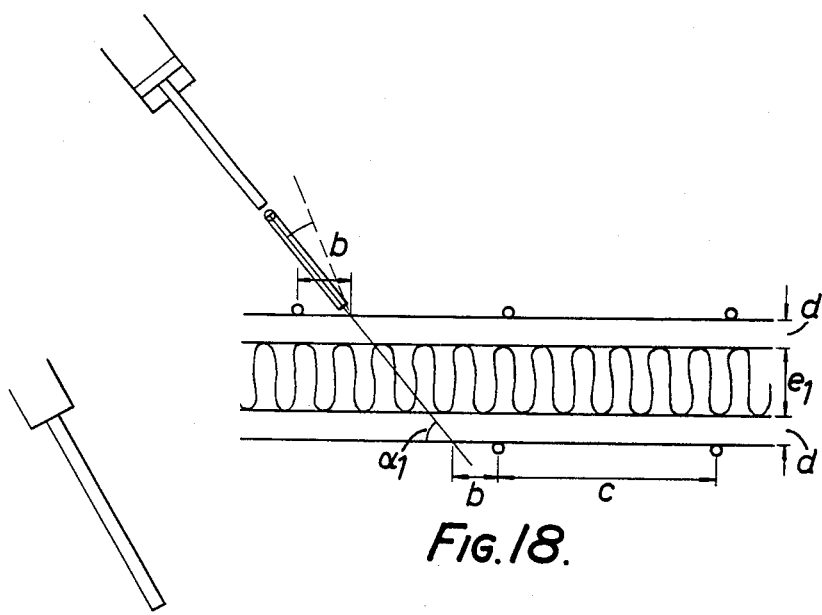
Figure 19:
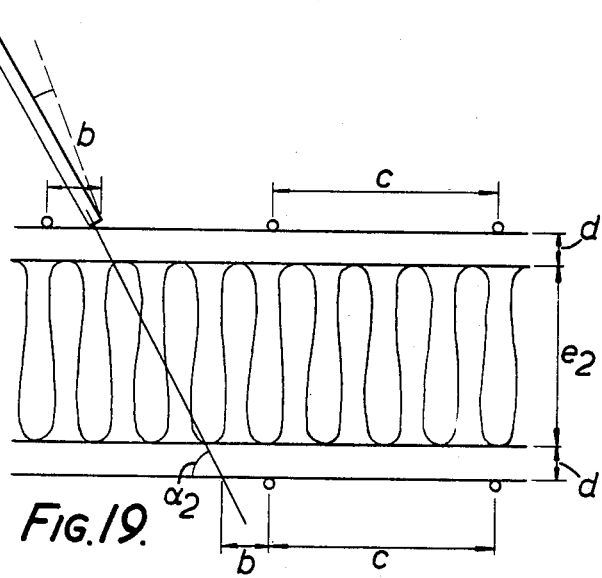

FIGS. 18 and 19 show the invariable parameters
c=mesh panel
d=distance between mesh and core
b=distance to the adjacent junction from the point of intersection of connector and longitudinal wire of the mesh.

Variable, on the other hand, are
The width of the core $e_1$ or $e_2$.
The angle of incidence of the connector with respect to the mesh 2, which is greater as thickness increases.

Figure 20:
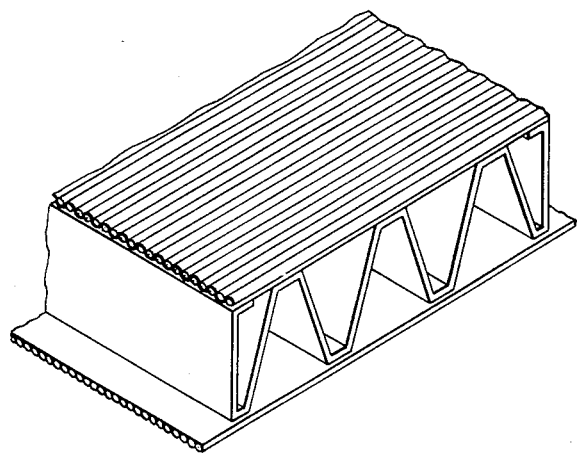

FIG. 20 is a view in perspective of continuous boxlike paperboard as it enters the machine, ready to be pierced by the connector wires.

Figure 21:
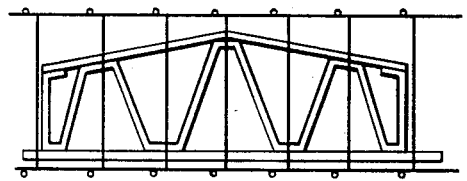

FIG. 21 is a cross-section of a paperboard box with the upper portion arched (a convenient form for recessing flooring, in the manner of a vault). The box is seen pierced by the connector wires.

Figure 22:
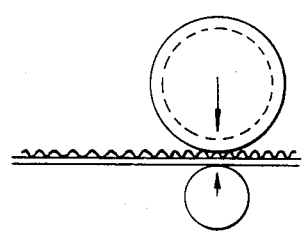
Figure 23:
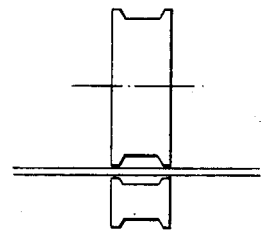
Figure 24:
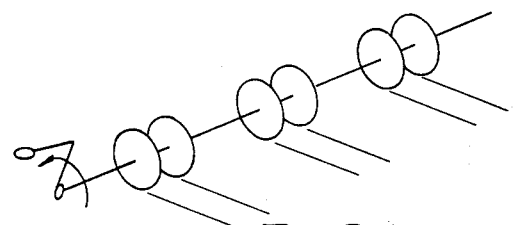

FIGS. 22, 23 and 24 illustrate how the slitting rollers mark a groove or trench in the crimped paperboard (formed by smooth paper glued to wrinkled or corrugated paper), and show the successive fold lines.

Figure 25:
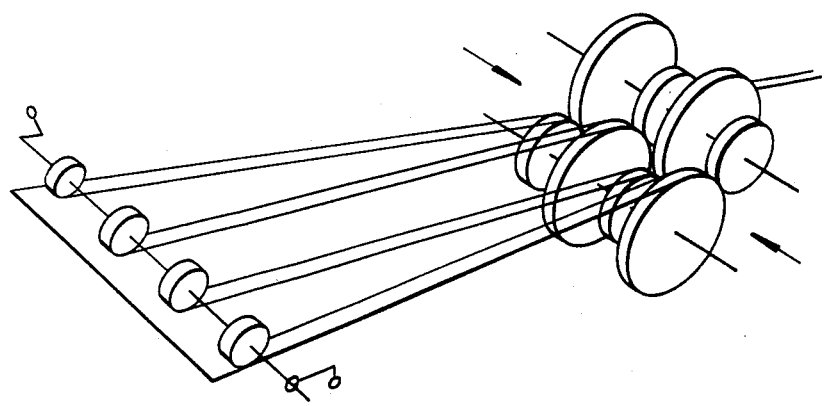
Figure 26:
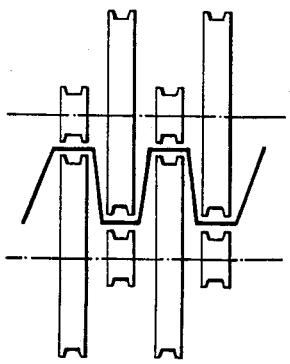

In FIGS. 25 and 26, the paperboard is shaped and propelled by some groups of wheels, which come together transversally as the paperboard advances and the rough relief gradually increases.

Figure 1:
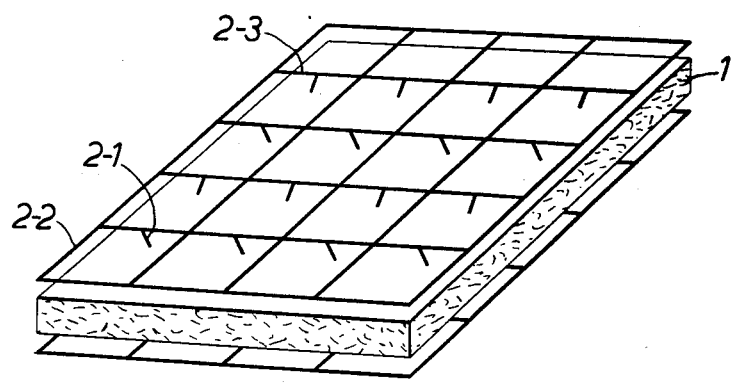
FIG. 1 is a diagram in perspective of the panel made in the installation according to the invention, with the elements comprising it.
Figure 2:
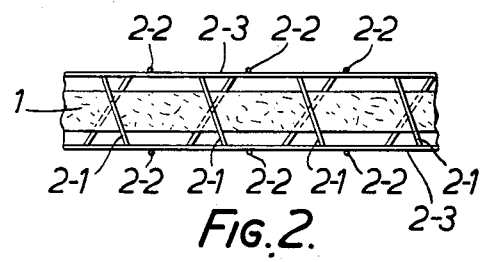
FIG. 2 represents any cross-section of the panel from the longitudinal or transversal direction.
Figure 3:
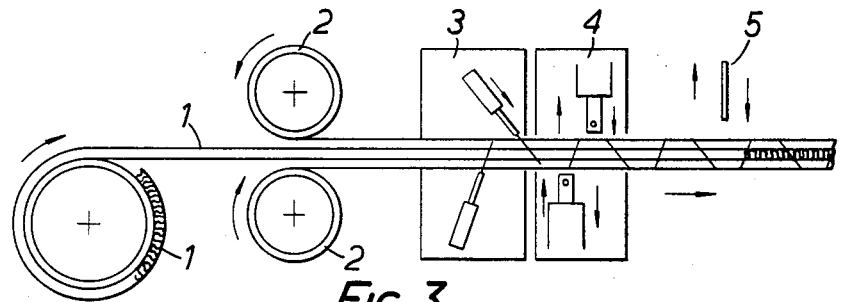
FIG. 3 is a top view diagram of the installation.

The machine function in the following manner:

The lightweight core 1 is inserted in the installation from roll 1, represented in FIGS. 3 and 4. Synchronous with the movement of the core, the upper and lower wire grilles 2, comprising the transversal wires 2-2 and the longitudinal wires 2-3, unroll from respective rolls 2 until they reach the fastener device 3, from which the connectors 2-1 are discharged and pass through the core 1, made for example of foam, by means of discharges 3-1 similar to injection syringes, the needle of which propels the pertinent connector 2-1 located in the lower-most position of the series of connectors contained in the loader or magazine 3-2. Upon being propelled or discharged, the connector is lodged inside the core against the transversal wires 2-2, ready to be welded at its ends in the following phase.

The loader 3-2, represented particularly in FIGS. 5 and 6, is fed from the hopper 3-4, the bottom of which contains two rollers 3-3 which turn in opposite directions and propel the connector wires one by one into the fastening device.

From the fastening device 3, the unit of meshes 2 and lightweight core 1 with connectors 2-1 imbedded in the latter advances intermittently, propelled by the traction system of the installation, so that the connectors 2-1 are finally placed in front of the vertical battery of electrodes (FIGS. 3 and 4).

In FIGS. 16 and 17 only the welding column on one side of the machine has been represented, since the other column is identical. The upper electrodes 4-1 of the column are solid with a common vertical flange, and the lower electrodes 4-2 are solid with another parallel flange or are free and are operated pneumatically.

In open position, the column is made to advance pneumatically to the position shown in FIG. 17, where the electrodes approach and resistance welding aided by compression is made of the pairs of wires, for example 2-1 and 2-2. If the installed power does not permit this (for example, if the work is being done on the job site), the welding equipment could be modified by making cascade stippling, that is, simultaneously pressuring the wires in column but welding one after another.

Following the welding operation, all that remains is the cutting of the panels to size. A saw 5 (see FIGS. 3 and 4) makes the cuts in transversal direction if a band saw, or vertically if a disk saw or laser beam cutter (in the last case the cut is cleaner).

The preceding description must be considered purely illustrative and in no way limitative, and any and all variations, substitutions of material, etc., may be included which fall within the scope of the following claims.

What is claimed:

1. Installation for the manufacture by a continuous process of compound panels for building construction, said panels being of variable cross-section and of any desire shape and comprising a metallic framework and a lightweight core, the metallic framework consisting of a three-dimensional wire grille or grating generally presented in the form of two parallel meshes jointed by a series of connector wires welded to them, said connector wires being inclined with respect to the wires of the meshes, the lightweight core consisting of a layer of foam resin or dense box material, paperboard laminate, fiber or plastic material, provided with reinforcing walls and unresistant to a wire segment passing through it, characterized in that it comprises:

(a) a machine including an intermittent traction and advancing device located within the interim of the machine, means for providing wire mesh, and separating means to introduce said wire mesh in parallel and separated a suitable distance wherein said intermittent traction and advancing machine and said separating means introduces parallel and separated a suitable distance, two sheets of mesh and one sheet of lightweight material into one end of (b) said machine including means for adjusting said machine to accommodate various thicknesses of said two sheets of mesh and said one sheet of lightweight material (c) said intermittent traction and advancing device intermittently moves the two sheets of mesh and the sheet of lightweight material a regulated distance to a first section of said machine, until they are placed in front of (d) a fastening device including a vertical battery of discharges to which (e) a dispensing device feeds a series of connector-wire segments which are then driven by the fastening device into the sheet of lightweight material, the ends of said wire segments resting against the longitudinal wires of the two meshes which advance intermittently inside the machine;

(f) the intermittent traction and advancing device moves the unit thus constituted, with the connector wires in place, to a a second section of said machine in front of (g) a column of electrodes for welding the connector-wire segments to the longitudinal wires of the two meshes;

(h) the intermittent traction and advancing device moves the panels, along with the imbedded connector elements, to a third section of said machine in front of (i) a saw device containing one or more disk, band or laser beam saws which cut the panels to the desired size; and (j) means for automatically controlling the operation of the machinery.

2. Installation according to claim 1, wherein said installation is mounted on an integral sized frame and is adapted to be transported by truck to a construction site.

3. Installation according to claim 1, characterized in that it contains some means for adhering, to one of the sides of the lightweight core prior to placement of the corresponding wire mesh, an aluminum or plastic sheet to serve as a vapor barrier.

4. Installation according to claim 1, wherein said means for providing the wire mesh are respective adjacent auxiliary machines which produce the mesh starting from common wire, and said lightweight material, provided for by an adjacent machine for extrusion of the lightweight material, said machine automatically extruding the sheeting from raw resin foam.

5. Installation according to claim 3, characterized in that in substitution of rolls of wire mesh, provision is made for a panel-feeding arrangement followed by a manual stapling or spot-welding device which joins the panels together to form the meshes.

6. Installation according to claim 3, characterized in that in substitution of the roll of lightweight material, provision is made for an arrangement for feeding panels of such material, followed by a manual glueing or stapling device for joining the panels.

7. Installation according to claim 1, characterized in that it is adapted to manufacture elements having cores of varying thickness and to insert connector-wire segments of varying length.

8. Installation according to claim 1, wherein said intermittent traction and advancing device includes at least one retractable rod having an engaging surface and being located beneath a panel formed by the elements advanced by the intermittent party of the vertical wires of the mesh, the constant and regulated advance distance being equal to the length of a mesh opening, and in that after each advance is completed each said engaging surface of said rod is separated laterally by some mechanical means to keep each said rod from fouling with the vertical wires of the mesh upon returning to their original position, that the lightweight core is held fast to the meshes and simultaneously clamped around a wire of each mesh.

9. Installation according to claim 1, characterized in that the connectors are handled in bulk, as flat or flexible combs in roll form, held together with lacquer or alternatively by adhesive tape, said combs entering the machine by means of a drive element which propels the comb units to a guillotine which separates each wire one by one, said separated wires then being driven into the lightweight core by said fastening device.

10. Installation according to claim 1, wherein the connector wires are of normal steel and undergo surface treatment prior to insertion of the machine, said connector wires being subjected to denuding by pickling to thus permit said wires to be welded to the meshes.

11. Installation according to claim 1, wherein for regulation of the width of the machine it is divided into two halves on a symmetrical plane, one half being movable transversally, the columns of the wire-fastening devices being rotary mounted to maintain the same angle of incidence of the connecting wire segments with respect to the surface of the lightweight core so that regardless of the thickness of a panel, the points at which the connectors cross with the mesh wires are always in the same position with respect to the adjacent junction points, and in such manner that the welding electrodes always face an intersection of a connector with a longitudinal wire of the mesh.

12. Installation according to claim 1 wherein said lightweight core is a paperboard core, said paperboard core being formed from three rolls of paperboard two of which form flat upper and lower core surfaces, and said machine includes a headpiece containing a system for deploying and glueing the flat upper and lower core surfaces to the ridges of a third continuous sheet of paperboard wrinkled folded in crenellated form, such folding of said central layer of the core being realized by means of some crimping rollers the folding then proceeding progressively by several series of rollers which give increasingly more height to the folds of the paperboard as it advances, said rollers simultaneously performing the function of advancing the paperboard.

13. Installation according to claim 1 wherein said means for automatically controlling the operation of the machinery includes a microprocessor, relays and electrovalves, said microprocessor ordering said relays and said electrovalves to operate the machinery at various sequences of the operation.

14. A method for manufacturing compound panels for building construction, said panels being of variable crosssection and of any desired shape and comprising a metallic framework and a lightweight core, the metallic framework consisting of a three-dimensional wire grille or grating generally presented in the form of two parallel meshes joined by a series of connector wires welded to them, said connector wires being inclined with respect to the wires of the meshes, the lightweight core consisting of a layer of foam resin or dense box material, paperboard laminate, fiber or plastic material, provided with reinforcing walls and unresistant to a wire segment passing through it, comprising the steps of:
introducing two sheets of mesh and one sheet of lightweight material, parallel and separated a suitable distance, into one end of a machine by means of an intermittent traction and advancing device located with said machine and means for separating said two sheets of wire mesh in parallel, said two sheets of wire mesh being supplied by wire mesh providing means, adjusting said machine by adjusting means to permit said machine to accommodate various thickness of said two sheets of mesh and said sheet of lightweight material to produce compound panels of various thicknesses after a third stage of operation; moving intermittently said two sheets of mesh and said sheet of lightweight material a regulated distance to a first stage of operation by means of the intermittent traction and advancing device;
driving a series of connector-wire segments in said sheet of lightweight material at the first stage of operation, the ends of said wire segments resting against longitudinal wires of said two meshes which advance intermittently inside the machine, said connector-wire segments being driven by a vertical battery of dischargers of a fastening device, a dispensing device feeding said connector-wire segments to said fastening device, said fastening device and said dispensing device being located at said first stage of operation;
moving the unit thus constructed, with the connector-wires in place by said intermittent traction and advancing device to a second stage of operation;
welding said connector-wire segments to said longitudinal wires of said two meshes at said second stage of the operation by means of a column of eletrodes to form panels;
moving said panels to a third stage of operation by said intermittent traction and advancing design;
cutting said panels to a desired size by means of a saw device including at least one disk, band or laser beam saw; said stages of operation being automatically controlled.

15. An installation for the manufacture by a continuous process of compound panels, said panels being of variable cross-section and of any desired shape and comprising a metallic framework and a lightweight core, the metallic framework, consisting of a three-dimensional wire grille or grating generally presented in the form of two parallel meshes joined by a series of connector wires welded to them, said connector wires being inclined with respect to the wires of the meshes, the lightweight core consisting of a layer of foam resin or dense box material, paperboard laminate, fiber or plastic material, provided with reinforcing walls and unresistant to a wire segment passing through it, comprising in combination:
means for providing wire mesh;
means to separate said wire mesh a suitable distance and to maintain said wire mesh in parallel;
a machine including an intermittent traction and advancing device wherein said intermittent traction and advancing device introduces two sheets of mesh and one sheet of lightweight material, parallel and separated a suitable distance into one end of said machine;
said machine including means for adjusting said machine to accommodate various thicknesses of said two sheets of mesh and said one sheet of lightweight material to produce compound panels of various thicknesses at the completion of a third stage of operation;
said intermittent traction and advancing device intermittently moves said two sheets of mesh and said one sheet of lightweight material a regulated distance to a first stage of operation;

a dispensing device and a fastening device, including a vertical battery of dischargers and a fastening device, each located at the first stage of operation, said dispensing device feeding a series of connector wire segments to said fastener, said vertical battery of dischargers then drives said connector wire segments into said sheet of lightweight material, the ends of said wire segments resting against longitudinal wires of said two meshes which advance intermittently inside the machine;

said intermittent traction and advancing device moves the unit thus constituted with said connector wires in place to a second stage of operation;

a column of electrodes located at said second stage of operation for welding the connector-wire segments to the longitudinal wires of said two meshes thereby forming panels;

said intermittent traction and advancing device moves said panels to the third stage of operation;

a saw device located at the third stage of operation, said saw device including at least one disk, band or laser beam saw for cutting the panels to a desired size; and means for automatically controlling the first, second and third stages of operation.

16. Installation according to claim 1, wherein said means for providing wire mesh are mesh rolls and said lightweight material is provided by a roll of lightweight magerial.

17. Installation according to claim 1 wherein said connector-wires are made of normal steel and undergo surface treatment prior to insertion in the machine, said connector-wires being subjected to denuding by grinding some 10 mm along each point to thus permit said wires to be welded to the meshes.

18. Installation according to claim 1 wherein said intermittent traction and advancing device solely outside all the intermittent movements of said two sheets of wire mesh and said sheet of lightweight core throughout the three sections of the machinery.

* * * * *